United States Patent
Bartalucci et al.

(10) Patent No.: US 9,876,451 B2
(45) Date of Patent: Jan. 23, 2018

(54) SYSTEM AND METHOD FOR CONTROLLING A SINUSOIDAL-DRIVE BRUSHLESS DC ELECTRIC MOTOR FOR AN AUTOMOTIVE POWER ACTUATOR

(71) Applicants: Marco Bartalucci, Castelfranco di Sotto (IT); Marco Marlia, Guasticce Collesalvetti (IT)

(72) Inventors: Marco Bartalucci, Castelfranco di Sotto (IT); Marco Marlia, Guasticce Collesalvetti (IT)

(73) Assignee: MAGNA CLOSURES S.p.A., Guasticce (Leghorn) (IT)

( * ) Notice: Subject to any disclaimer, the term of this patent is extended or adjusted under 35 U.S.C. 154(b) by 0 days.

(21) Appl. No.: 14/178,779

(22) Filed: Feb. 12, 2014

(65) Prior Publication Data

US 2014/0232310 A1    Aug. 21, 2014

(30) Foreign Application Priority Data

Feb. 15, 2013 (IT) .................................. TO13A0129

(51) Int. Cl.
| | | |
|---|---|---|
| *H02K 41/02* | (2006.01) | |
| *H02K 5/16* | (2006.01) | |
| *H02P 5/68* | (2006.01) | |
| *H02P 6/14* | (2016.01) | |
| *H02P 6/16* | (2016.01) | |
| *H02P 6/15* | (2016.01) | |

(52) U.S. Cl.
CPC ............. *H02P 6/142* (2013.01); *H02P 6/153* (2016.02); *H02P 6/16* (2013.01)

(58) Field of Classification Search
CPC .... H02P 6/00; H02P 6/002; H02P 6/16; H02P 6/165
See application file for complete search history.

(56) References Cited

U.S. PATENT DOCUMENTS 4,004,371 A * 1/1977 Podolan ................ E05F 11/426
49/352
4,737,898 A  4/1988 Banfalvi
(Continued)

FOREIGN PATENT DOCUMENTS

| EP | 1612927 A1 | 1/2006 |
|---|---|---|
| GB | 2345204 A | 6/2000 |

(Continued)

*Primary Examiner* — Eduardo Colon Santana
*Assistant Examiner* — Charles S Laughlin
(74) *Attorney, Agent, or Firm* — Dickinson Wright PLLC

(57) ABSTRACT

A control system (14) for controlling a brushless electric motor (1) for an automotive power actuator (10), having a rotor (3) operable to rotate with respect to stator windings (2a, 2b, 2c), the control system (14) is provided with: a position sensing unit (4a-4c, 30) coupled to the rotor (3), to sense its angular position and to provide a sensed position ($\theta$); and a generation unit (24), to generate driving voltages and/or currents for the stator windings (2a, 2b, 2c), as a function of the angular position of the rotor (3). A position estimation module (25) is coupled to the position sensing unit (4a-4c, 30), to receive the sensed position ($\theta$) and to correct the value of the sensed position ($\theta$), thereby providing a corrected angular position ($\theta_r$) to the generation unit (24).

18 Claims, 4 Drawing Sheets

(56) References Cited

U.S. PATENT DOCUMENTS

| | | | |
|---|---|---|---|
| 5,479,087 A | 12/1995 | Wright | |
| 6,825,641 B2 | 11/2004 | Pigott | |
| 7,095,193 B2* | 8/2006 | Kellogg | H02K 29/08 |
| | | | 318/139 |
| 7,969,043 B2 | 6/2011 | Caraghiorghiopol et al. | |
| 8,648,556 B2 | 2/2014 | Lejeune et al. | |
| 2005/0253541 A1* | 11/2005 | Stork | 318/254 |
| 2006/0001393 A1* | 1/2006 | Rozman | H02P 6/10 |
| | | | 318/400.21 |
| 2006/0012321 A1* | 1/2006 | Rozman | F02C 7/275 |
| | | | 318/432 |
| 2007/0031131 A1* | 2/2007 | Griffitts | 388/811 |
| 2009/0121664 A1* | 5/2009 | Sugimoto | H02P 6/12 |
| | | | 318/400.09 |
| 2009/0190903 A1* | 7/2009 | Komatsu | B62D 5/046 |
| | | | 388/803 |
| 2009/0322267 A1* | 12/2009 | Mock et al. | 318/400.21 |
| 2010/0090640 A1 | 4/2010 | Maekawa et al. | |
| 2011/0108369 A1* | 5/2011 | Stolt | B66B 1/30 |
| | | | 187/391 |
| 2012/0249124 A1* | 10/2012 | Ionescu | G01R 33/072 |
| | | | 324/207.2 |
| 2013/0300324 A1* | 11/2013 | Kaufmann et al. | 318/400.04 |

FOREIGN PATENT DOCUMENTS

| | | |
|---|---|---|
| JP | 2000217248 A | 8/2000 |
| JP | 2001 128479 A | 5/2001 |
| JP | 2010 011543 A | 1/2010 |
| JP | 2010 090640 A | 4/2010 |
| WO | WO2011/070165 A2 | 6/2011 |

* cited by examiner

SYSTEM AND METHOD FOR CONTROLLING A SINUSOIDAL-DRIVE BRUSHLESS DC ELECTRIC MOTOR FOR AN AUTOMOTIVE POWER ACTUATOR

CROSS-REFERENCE TO RELATED APPLICATION

The subject application claims priority to IT Patent Application Serial No. TO2013A000129 filed on Feb. 15, 2013 and entitled a "System and Method for Controlling a Sinusoidal-Drive Brushless DC Electric Motor for an Automotive Power Actuator", the entire disclosure of which is incorporated herein by reference.

BACKGROUND

The present invention relates to a system and to a method for controlling a sinusoidal-drive brushless DC electric motor for an automotive power actuator, in particular of a motor-vehicle closure device, such as a latch cinch actuator or a window regulator, to which the following description will make explicit reference.

The expression "closure device" will be used, in the following description and the accompanying claims, to generally indicate any element movable between an open position and a closed position, respectively opening and closing an access to an inner compartment of a motor vehicle, therefore including, boot, rear hatches, bonnet lid or other closed compartments, windows, sunroofs, in addition to the side doors of a motor vehicle.

Use of brushless DC electric motors has already been proposed in a motor vehicle, for driving power actuators, such as window regulators.

SUMMARY OF THE INVENTION

As schematically shown in FIG. 1, a brushless DC (Direct Current) electric motor 1 includes a number of stator windings 2a, 2b, 2c (three in the example, connected in a star configuration), and a rotor 3, having two poles ('N' and 'S') in the example, which is operable to rotate with respect to the stator windings 2a, 2b, 2c.

Control of the brushless DC electric motor 1 envisages electrical periodical switching of the currents flowing in the stator windings 2a, 2b, 2c, in order to maintain the rotation of the rotor 3, via the resulting magnetic interaction.

The control action usually requires knowledge of the position of the rotor 3, during its rotation; accordingly, Hall sensors, or other kinds of position sensors, shown schematically as 4a, 4b, 4c, are circumferentially arranged with respect to the stator windings 2a, 2b, 2c (e.g. with an angular distance of 120°), in order to detect the position of the rotor 3.

For example, using three on/off Hall position sensors 4a, 4b, 4c, the magnetic position of the rotor 3 may be detected for six different radial zones, as schematically shown in FIG. 2 (where the different codes corresponding to the outputs provided by the position sensors 4a, 4b, 4c are shown for each zone, as well as the orientation of the stator flux, in quadrature to the rotor flux).

As shown in FIG. 3, control of the brushless DC electric motor 1 may be implemented in a so called "trapezoidal mode", whereby the phase voltages in the stator windings 2a, 2b, 2c have a trapezoidal pattern, being constant for each rotor zone.

This control scheme generates however a discontinuous change from one zone to the next one, and this behaviour induces non-constant torque and mechanical noise in the system.

Use of a sinusoidal drive for the brushless DC electric motor 1 may thus be advantageous, in order to generate a constant power and torque and to reduce the ripple and mechanical noise.

In the sinusoidal drive mode, the brushless DC electric motor 1 is supplied by three-phase PWM voltages modulated to obtain phase currents of a sinusoidal shape in the stator windings 2a, 2b, 2c, as schematically shown in FIG. 4.

For sine wave generation, the rotor angle has to be known with a sufficiently high resolution, so that, usually, encoders, resolvers, or other high resolution position sensors are used, instead of low resolution sensors, like the Hall sensors.

The use of high resolution sensors, however, entails higher costs and, also, a higher likelihood of errors occurring during operation.

Therefore, among other things, a need is felt in the field for a simpler but at the same time reliable control solution for a sinusoidal-drive brushless DC electric motor.

It is thus an object of certain aspects of the present invention to provide an improved control solution, designed to meet the aforementioned need.

This object can be achieved by a control system and method, as defined in the appended claims.

BRIEF DESCRIPTION OF THE DRAWINGS

A preferred, non-limiting embodiment of certain aspects of the present invention will be described by way of example with reference to the accompanying drawings, in which.

DETAILED DESCRIPTION

Figure 5:
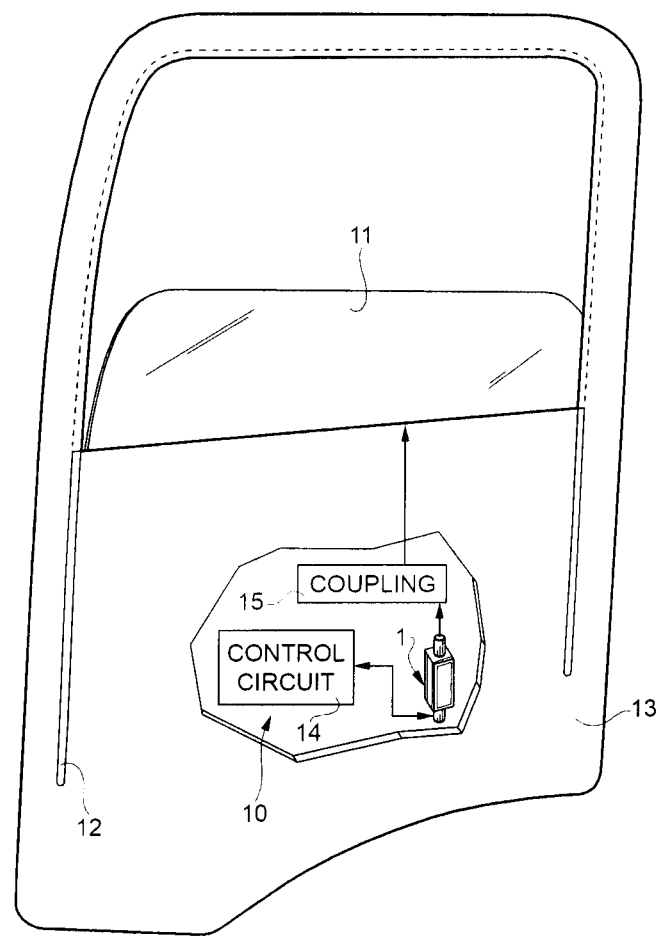
FIG. 5 shows schematically an automotive power actuator, in particular a motor-vehicle window regulator.

Number 10 in FIG. 5 denotes as a whole an automotive power actuator of a motor vehicle (not shown), in particular a window regulator, operable for driving a slider pane or window 11 between open and closed positions with respect to a supporting frame 12, fixed to a vehicle door 13.

Figure 1:
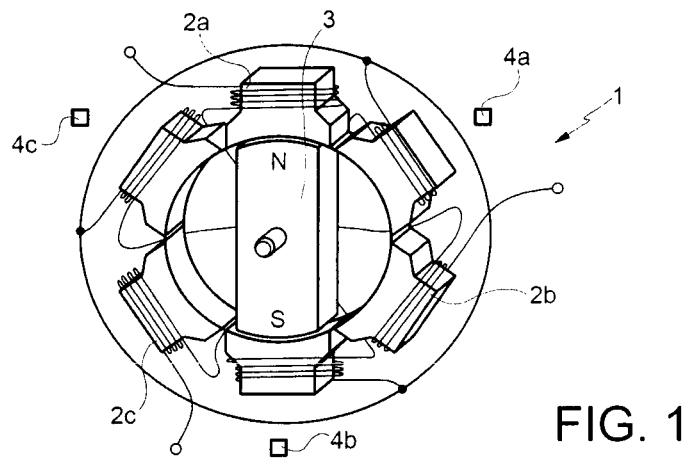
FIG. 1 is a schematic representation of a brushless DC electric motor, of a known type.
Figure 2:
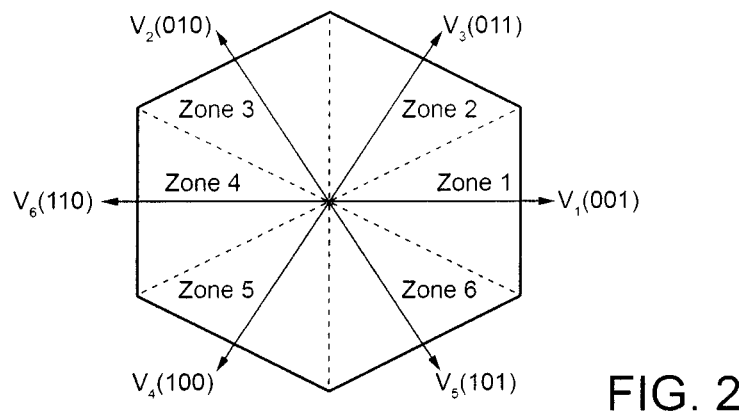
FIG. 2 is a schematic representation of operating zones of the brushless DC electric motor.

The power actuator 10 includes a brushless DC electric motor, denoted again with 1, e.g. made as shown in FIG. 1 (so that same numerals will be used again to denote its constituent parts), and a control circuit 14, electrically coupled to the brushless DC electric motor 1, and including (as will be discussed in the following) suitable hardware and/or software to control the operation of the same brushless DC electric motor 1.

The power actuator 10 further includes a mechanical coupling assembly 15 (shown schematically), including e.g. rotating output shafts, gear trains and/or reduction gear trains, coupling the brushless DC electric motor 1 to the window 11, so as to cause its movement with respect to the supporting frame 12.

Figure 6:
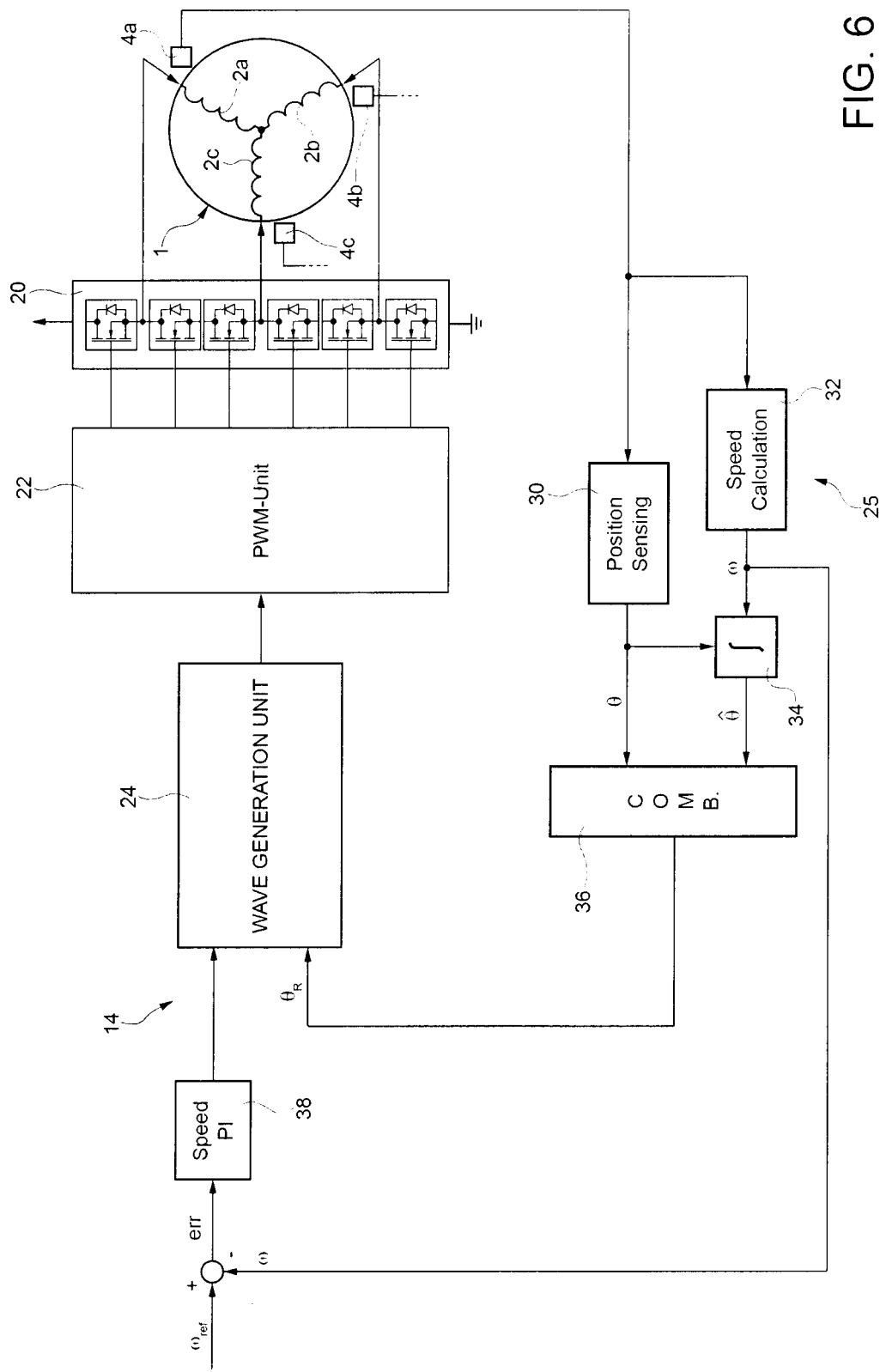
FIG. 6 shows a block diagram of a control system of a brushless DC electric motor of the power actuator of FIG. 5.

An aspect of the present solution, as shown in FIG. 6, envisages control of the brushless DC electric motor 1 in a sinusoidal mode, using low resolution position sensors, such as on/off Hall position sensors, again denoted with 4a, 4b, 4c, to detect the angular position of the rotor 3; in order to improve the accuracy of position detection, a position estimation is concurrently provided, based on the time integration of the motor speed, determined as a function of the output of at least one of the same position sensors 4a, 4b, 4c.

In detail, the control circuit 14 of the power actuator 10 includes a three-phase inverter 20, and a PWM (Pulse Width Modulation) unit 22, coupled to the phase stator windings 2a, 2b, 2c.

In a known manner, here not discussed in detail, the three-phase inverter 20 includes a pair of power transistor switches for each stator winding 2a, 2b, 2c, which are controlled by the PWM unit 22 so as to drive the respective phase voltages either at a high (ON) or a low (OFF) value, in order to control the average value of related voltages and/or currents.

The control circuit 14 further includes a wave generation unit 24 and a position estimation module 25.

The position estimation module 25 is configured to provide an accurate estimate of the angular position $\theta_r$ of the rotor 3 of the brushless DC electric motor 1, based on the outputs of the position sensors 4a, 4b, 4c coupled to the same brushless DC electric motor 1.

The wave generation unit 24 is coupled to the PWM unit 22 and three-phase inverter 20, and is configured to generate suitable voltage and/or current waveforms to drive the stator windings 2a, 2b, 2c of the brushless DC electric motor 1, also based on the angular position $\theta_r$ of the rotor 3 provided by the position estimation module 25.

In a manner not discussed in detail, a closed loop speed control scheme may be implemented, via a PWM control of the voltages on the three phases of the motor (which in turn allows to realize a current loop control of the three phase currents).

In a manner not discussed in detail, in case the desired waveforms to be generated are not sinusoidal, the wave generation unit 24 may include a look-up table for generation of the waveforms based on the detected rotor angular position $\theta_r$.

In more details, the position estimation module 25 includes a rough, or coarse, position sensing unit 30, which is coupled to the position sensors 4a, 4b, 4c and receives therefrom the detected position signals, in order to obtain a rough determination of the sensed position $\theta$ of the rotor 3 (e.g. in terms of the sector or zone in which the same rotor 3 is located during its rotation). For example, in the case where three position sensors 4a, 4b, 4c are used, the position determined by the rough position sensing unit 30 has an error of about 60°.

The position estimation module 25 further includes a speed calculation unit 32, which is coupled to at least one of the same position sensors 4a, 4b, 4c (i.e. to one, two or all three position sensors 4a, 4b, 4c), and is configured to determine the speed $\omega$ of the rotating rotor 3, based on the sensor switching timing.

In particular, the speed calculation unit 32 determines a switching period Ts of the at least one position sensor 4a, 4b, 4c, and calculates the speed $\omega$ as the function of the inverse of the switching period Ts:

$$\omega = f(1/Ts).$$

Figure 3:
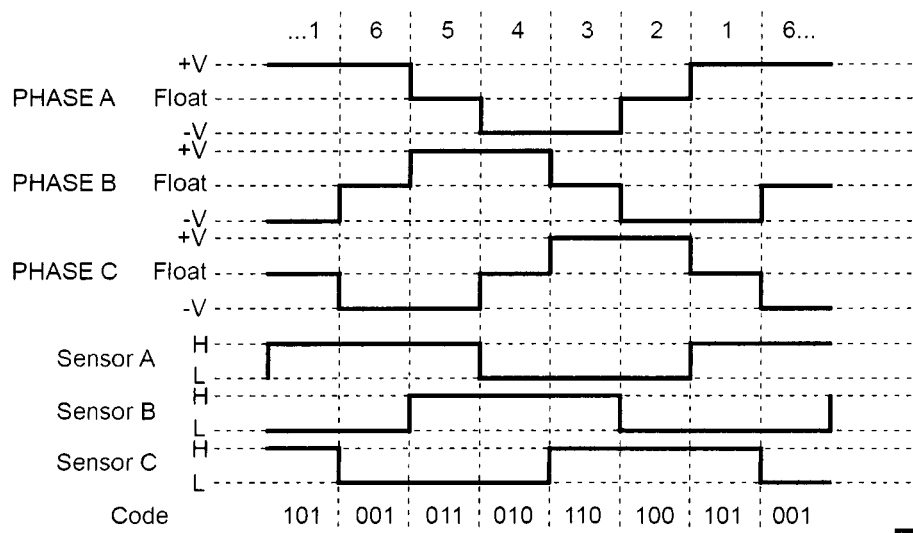
FIGS. 3 and 4 show plots of electrical quantities associated to different driving modes of the brushless DC electric motor.
Figure 4:
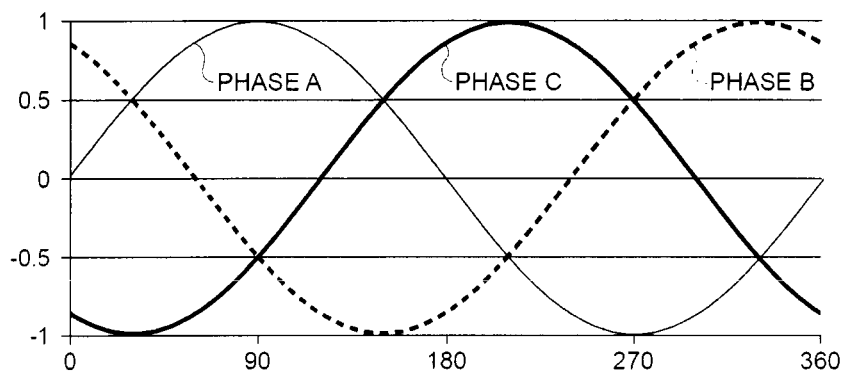

In the simplest case in which the rotor 3 has a single pair of magnetic poles, the switching period Ts is the sum of the two half-periods, in which the sensor output is respectively at the high or low level (see e.g. the exemplary plots in FIG. 3). In the case where the rotor 3 has a higher number of pairs of magnetic poles, the speed calculation unit 32 may sum all the respective half-periods, in order to calculate the switching period Ts to be in any case indicative of a whole mechanical rotation cycle for the rotor 3. As an alternative, the calculated switching period may represent an integer multiple of a single mechanical rotation cycle of the rotor 3; another alternative may envisage calculating the period on one pair of poles, by adding one high level pulse with the subsequent low level pulse.

The position estimation module 25 includes a time integration unit 34, coupled to the speed calculation unit 32 to receive therefrom the calculated speed $\omega$, and configured to perform a time integration of the same speed $\omega$, to obtain an estimated position $\hat{\theta}$ of the angular position of the rotor 3:

$$\hat{\theta} = \int \omega \, dt$$

The position estimation module 25 further includes a combination unit 36, which is coupled to both the rough position sensing unit 30 and the time integration unit 34, receiving therefrom both the sensed position $\theta$ and the estimated position $\hat{\theta}$.

The combination unit 36 is configured to implement a suitable algorithm, as will be discussed in detail in the following, for combining the sensed position $\theta$ and the estimated position $\hat{\theta}$ in order to generate the accurate estimate of the angular position $\theta_r$ of the rotor 3, to be used for the control action of the brushless DC electric motor 1.

The estimate of the angular position $\theta_r$ is given by a weighted combination of the sensed position $\theta$ and the estimated position $\hat{\theta}$, according to the following expression:

$$\theta_r = \alpha_1 \cdot \theta + \alpha_2 \cdot \hat{\theta}$$

where $\alpha_1$ and $\alpha_2$ are a first and a second weight coefficients, where $\alpha_1$ is different from $\alpha_2$.

The control circuit 14 may further include a speed controller 38 (e.g. of the PI —Proportional Integral—type or PID—Proportional Integral Derivative—type), which receives the calculated speed $\omega$ from the speed calculation unit 32 and a reference speed $\omega$ref, which represents a predetermined speed profile for the movement of the window 11 with respect to the supporting frame 12.

The speed controller 38, in a manner not discussed in detail herein, generates a reference error err for the wave generation unit 24, to implement the speed closed loop control.

Figure 7:
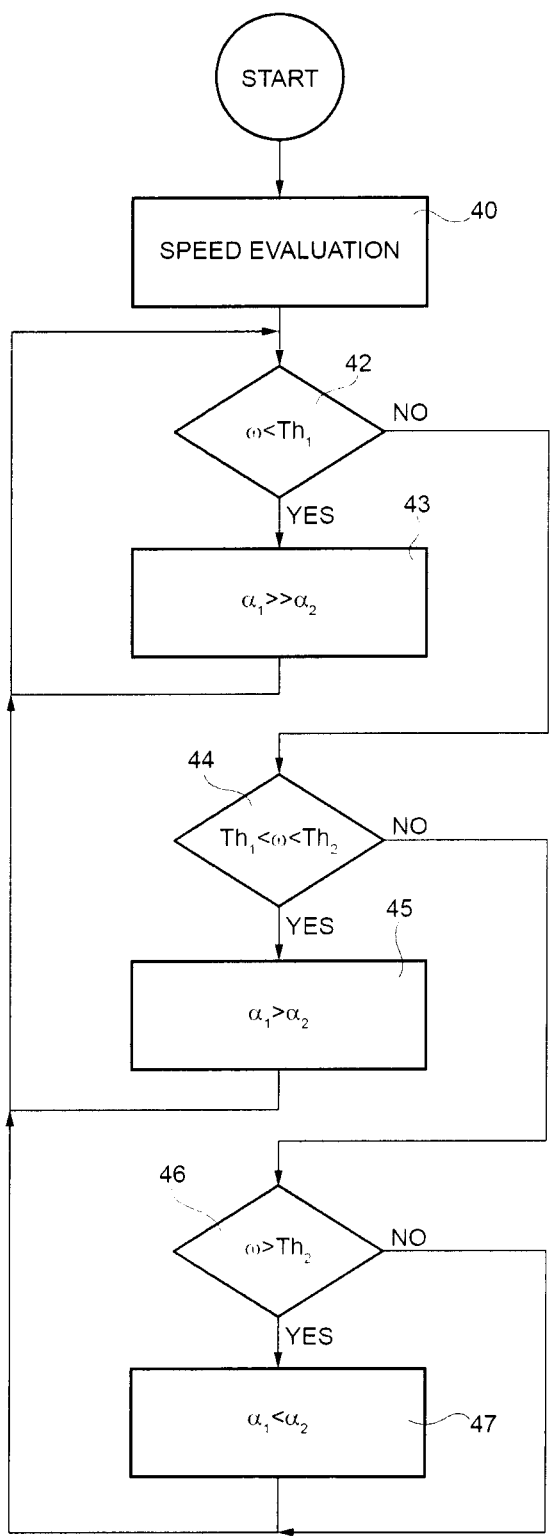
FIG. 7 is a flow chart of control operations performed in the control system of FIG. 6.

The algorithm implemented by the combination unit 36 is now discussed in more details, with reference also to FIG. 7.

In general, this algorithm envisages weighting in a different manner the sensed position $\theta$ and the estimated position $\hat{\theta}$, as a function of the different operating speeds of the electric DC brushless electric motor 1; accordingly, the combination unit 36 may receive the calculated speed $\omega$, as an indication of the operating speed of the electric DC brushless electric motor 1.

The combination unit 36 is configured to evaluate the value of the calculated speed $\omega$, at step 40.

If the calculated speed $\omega$ is below a first predetermined threshold Th1, as determined at step 42, which is indicative of a stall or a low frequency operating condition, substantially only the sensed position $\theta$ is used to generate the estimate of the angular position $\theta_r$.

Indeed, the estimation based on the calculated rotor speed ω cannot be reliably used at the start-up of the brushless DC electric motor 1, since in this first operating phase the angular speed of the rotor 3 is highly irregular.

In other words, in this operating condition, the first weight coefficient α1 is chosen, at step 43, with a value much higher than the second weight coefficient α2 in the combination expression for determining the estimate of the angular position θ$_r$:

$$\alpha 1 >> \alpha 2.$$

If the calculated speed ω is higher than the first predetermined threshold Th1, but still below a second predetermined threshold Th2, having a value higher than the first predetermined threshold Th1, i.e. at medium transition speed, as determined at step 44, the sensed position θ is set to be predominant in the combination expression. In other words, the first weight coefficient α1 is chosen, at step 45, with a value higher than the second weight coefficient α2 in the combination expression for determining the estimate of the angular position θ$_r$:

$$\alpha 1 > \alpha 2.$$

If instead the calculated speed ω is higher than the second predetermined threshold Th2, i.e. at higher frequencies, including normal operating speed, as determined at step 46, the estimated position $\hat{\theta}$ becomes predominant in the combination expression. In other words, the first weight coefficient α1 is chosen, at step 47, with a value lower than the second weight coefficient α2 in the combination expression for determining the estimate of the angular position θ$_r$:

$$\alpha 1 < \alpha 2.$$

The advantages of the discussed solution are clear from the foregoing description.

In particular, it is underlined that a reliable estimate of the angular position θ$_r$ of the rotor 3 of the brushless DC electric motor 1 is obtained, without resorting to the use of complex and expensive sensors (such as encoder sensors), and with the use of a limited number of low resolution position sensors, like Hall position sensors.

Accordingly, the brushless DC electric motor 1 may be reliably controlled, with cost and resource savings.

Clearly, changes may be made to what is described and illustrated herein without, however, departing from the scope defined in the accompanying claims.

In particular, it is underlined that a different number of position sensors may be used; in particular, even one or two position sensors (e.g. Hall position sensors) could be used in the discussed control system, with the sensed position being corrected thanks to the discussed speed integration operation.

In general, it is however clear that the higher is the number of position sensors being used, the higher is the resolution that may be obtained for the initial estimation of the rotor position.

The number of rotor poles and/or stator windings of the brushless DC electric motor 1 could be different from the exemplary embodiment previously discussed.

In the window regulator embodiment, the same position sensors 4a, 4b, 4c used for controlling the brushless DC electric motor 1 may also be used, in a known manner not discussed in detail, to implement an anti-pinch function with respect to the movement of the window 11.

Moreover, it is clear that the discussed control system and method may be used advantageously with other automotive power actuators in the motor vehicle, different from the window regulator discussed in the preferred embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power actuator for use in motor vehicles to move a closure device between open and closed positions for respectively opening and closing an access to an inner compartment of the motor vehicle, the power actuator comprising:

a brushless DC electric motor having a rotor operable to rotate with respect to stator windings;

a coupling mechanism mechanically interconnecting the rotor of the electric motor to the closure device and operable for causing movement of the closure device between the open and closed positions in response to rotation of the rotor relative to the stator windings;

position sensors configured to sense an angular position of the rotor and provide position signals indicating the sensed angular position (J) of the rotor;

a control system for controlling operation of the electric motor and including a wave generation unit and a position estimation module, wherein the wave generation unit is configured to generate voltage and/or current waveforms to drive the stator windings as a function of a corrected angular position (J$_r$) of the rotor;

the position estimation module including a position sensing unit coupled to the position sensors for receiving the position signals indicating the sensed angular position (J) of the rotor;

the position estimation module further including a speed calculation unit coupled to at least one of the position sensors and configured to determine a speed (ω) of the rotor based on at least one of the position signals provided by the position sensors;

the position estimation module further including a time integration unit coupled to the speed calculation unit and configured to perform a time integration of the determined rotor speed (ω) and generate an estimated angular position (Ĵ);

the speed calculation unit disposed between and coupled to the at least one of the position sensors and the time integration unit and configured to receive the position signal provided by the position sensors and to transmit the determined speed (ω) of the rotor to the time integration unit; and a combination unit coupled to and disposed between the wave generation unit and the position sensing unit, and coupled to and disposed between the wave generation unit and the time integration unit, wherein the wave generation unit receives the sensed angular position (J) from the position sensing unit and the estimated angular position (Ĵ) from the time integration unit and generates the corrected angular position (J$_r$) of the rotor using a combination of the sensed angular position (J) and the estimated angular position (Ĵ) and transmits the generated corrected angular position (J$_r$) to the wave generation unit.

2. The power actuator of claim 1, wherein the position sensors are switching magnetic sensors, and wherein the speed calculation unit is configured to determine the speed ($\omega$) as a function of a switching timing of the at least one position signal provided by the position sensors.

3. The power actuator of claim 2, wherein the speed calculation unit is configured to determine the speed ($\omega$) as a function of the inverse of a switching period ($T_s$) of the at least one position signal.

4. The power actuator of claim 2, wherein the position sensors are Hall magnetic sensors electrically coupled to the brushless electric motor.

5. The power actuator of claim 4, wherein a number of the Hall magnetic sensors is not higher than three.

6. The power actuator of claim 1, wherein the combination unit is configured to combine, with a respective weight coefficient ($\alpha_1$, $\alpha_2$), the sensed angular position (J) and the estimated angular position ($\hat{J}$) in order to generate the corrected angular position ($J_r$).

7. The power actuator of claim 6, wherein the combination unit is configured to implement a weighting algorithm to determine the respective weight coefficients ($\alpha_1$, $\alpha_2$) as a function of the operating condition of the brushless electric motor.

8. The power actuator of claim 6, wherein the combination unit is configured to implement a weighting algorithm to determine the respective weight coefficients ($\alpha_1$, $\alpha_2$), as a function of the speed ($\omega$) of the rotor.

9. The power actuator of claim 8, wherein the weighting algorithm utilizes a first weight coefficient ($\alpha_1$) for the sensed angular position (J) that is higher than a second weight coefficient ($\alpha_2$) for the estimated angular position ($\hat{J}$) when the speed ($\omega$) is lower than a given threshold ($Th_2$).

10. The power actuator of claim 8, wherein the weighting algorithm utilizes a first weight coefficient ($\alpha_1$) for the sensed angular position (J) that is lower than a second weight coefficient ($\alpha_2$) for the estimated angular position ($\hat{J}$) when the speed ($\omega$) is higher than a given threshold ($Th_2$).

11. The power actuator of claim 1, configured as a window regulator for moving a window.

12. The power actuator of claim 1, configured as a latch actuator for a latch mechanism for a vehicle side door.

13. The power actuator of claim 1, wherein the position sensors are low resolution sensors.

14. A method for controlling a power actuator operable to move a closure device between open and closed positions respectively opening and closing an access to an inner compartment of a motor vehicle, the method comprising the steps of:

providing the power actuator with a brushless DC electric motor and a coupling mechanism, wherein the electric motor includes a rotor operable to rotate with respect to stator windings, and wherein the coupling mechanism mechanically interconnects the rotor of the electric motor to the closure device and functions to move the closure device between the open and closed positions in response to rotation of the rotor relative to the stator windings;

receiving position signals from at least one position sensor on the rotor with a position sensing unit and generating a position signal indicative of a sensed angular position (J) of the rotor;

determining a switching period $T_s$ of the at least one position sensor with a speed calculation unit;

calculating a speed ($\omega$) as a function of the inverse of the switching period $T_s$ with the speed calculation unit, and transmitting the calculated speed ($\omega$) to a time integration unit, wherein the speed calculation unit is disposed between and coupled to the at least one position sensor and the time integration unit;

performing a time integration of the rotor speed ($\omega$) with the time integration unit to generate an estimated angular position ($\hat{J}$) of the rotor;

transmitting the sensed angular position (J) and the estimated angular position ($\hat{J}$) to a combination unit, and calculating a corrected angular position ($J_r$) of the rotor with the combination unit by combining the sensed angular position (J) and the estimated angular position ($\hat{J}$), wherein the combination unit is coupled to and disposed between a wave generation unit and the position sensing unit, and coupled to and disposed between the wave generation unit and a time integration unit; and transmitting the corrected angular position from the combination unit to the wave generation unit and generating voltages and/or current waveforms to drive the stator windings based on the corrected angular position ($J_r$) of the rotor with the wave generation unit.

15. The method of claim 14, wherein the position sensors include at least two low resolution position sensors that are used to sense the angular position of the rotor and provide the sensed angular position (J).

16. The method of claim 15, wherein the position sensors are switching magnetic sensors, and wherein the angular speed ($\omega$) of the rotor is determined as a function of the inverse of a switching period ($T_s$) of at least one of the position sensors.

17. The method of claim 14, wherein a respective weight coefficient ($\alpha_1$, $\alpha_2$) are used in conjunction with the sensed angular position (J) and the estimated angular position ($\hat{J}$) to generate the corrected angular position ($J_r$).

18. The method of claim 17, wherein a weighting algorithm is used to determine the value of the respective weight coefficients ($\alpha_1$, $\alpha_2$).

* * * * *